Feb. 14, 1933. P. N. PETERS 1,897,141
SYSTEM FOR DETECTING FAULTS IN SHARP EDGED TOOLS
Original Filed Jan. 8, 1930    2 Sheets-Sheet 1
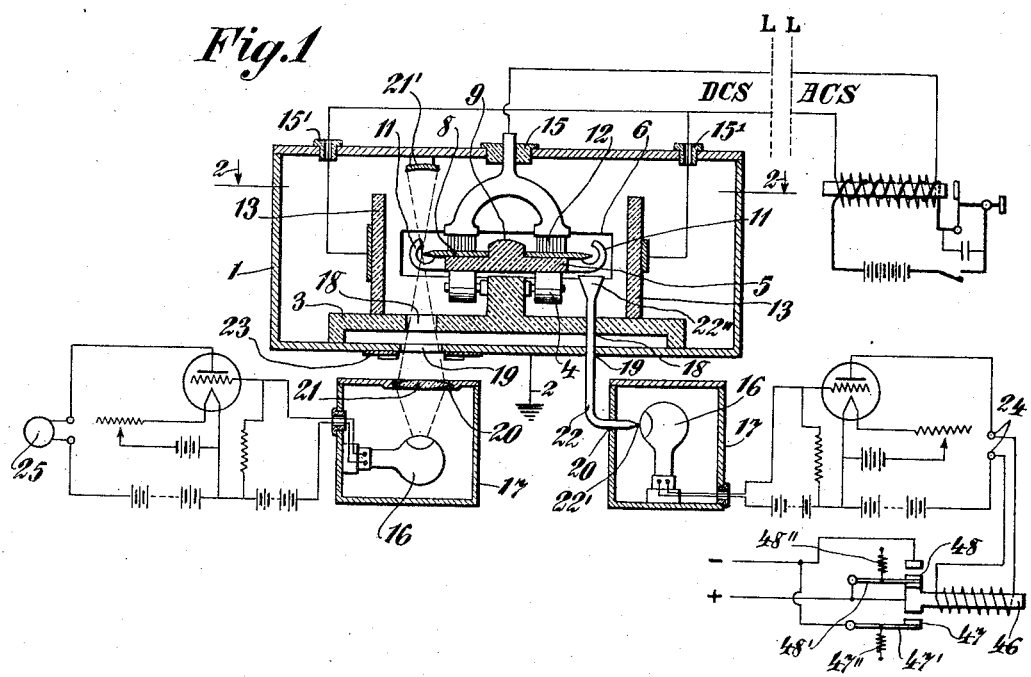
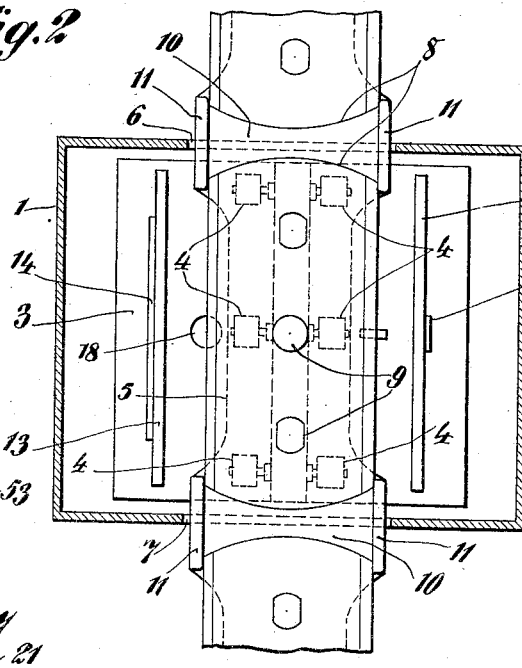
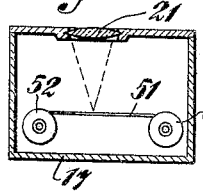
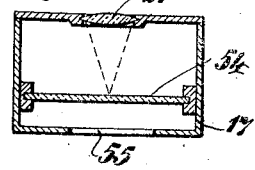
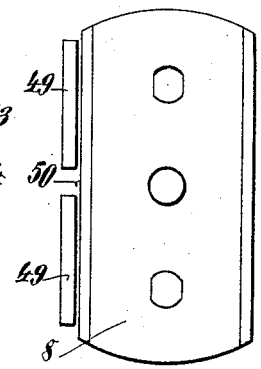
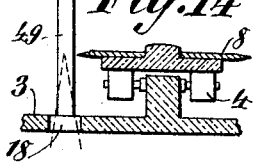
INVENTOR
Peter Nicholas Peters,
BY Alexander Chessin
his ATTORNEY

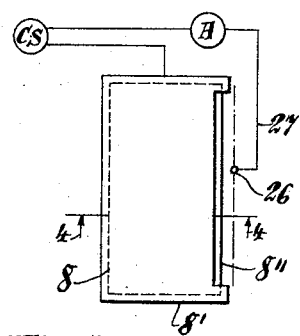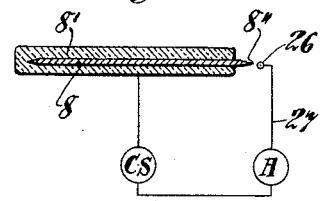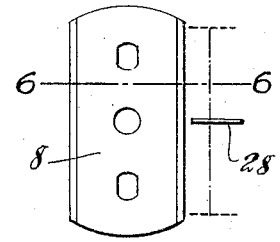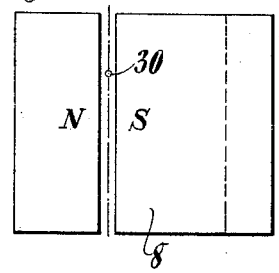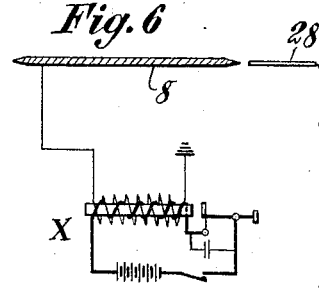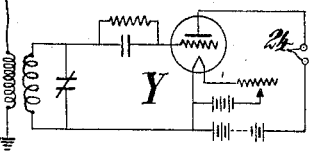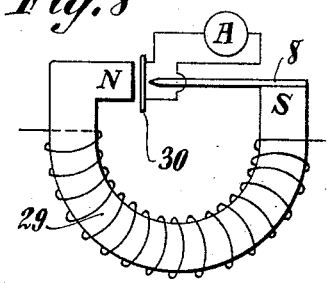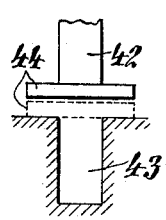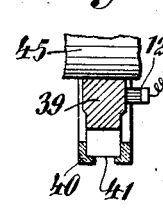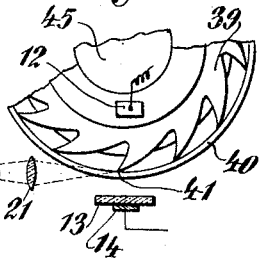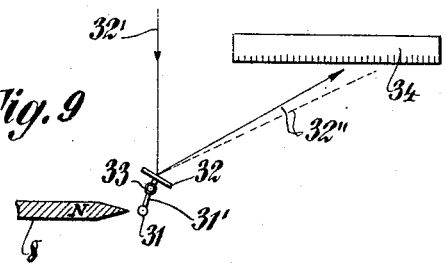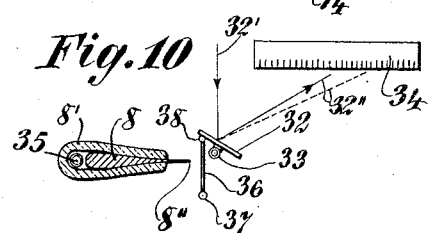

Patented Feb. 14, 1933

1,897,141

UNITED STATES PATENT OFFICE

PETER NICHOLAS PETERS, OF BROOKLYN, NEW YORK

SYSTEM FOR DETECTING FAULTS IN SHARP EDGED TOOLS

Application filed January 3, 1930, Serial No. 419,296. Renewed October 15, 1931.

My invention relates to systems for detecting the condition of the edge of any sharp edged metallic body. It is especially adapted for the detection of irregularities in the cutting edges of various tools. More particularly, my invention is applicable to the inspection of razors and razor blades and to the discovery of defects in their cutting edges.

So far as I am aware, the only commercially practical method for detecting faults in the cutting edges of very sharp, thin metallic bodies, such as razors or razor blades, in use today, is direct inspection by human agency. Microscopic analysis, although available as a laboratory method, is not commercially practical for obvious reasons. That inspection by direct human agency is inefficient is too well known to require argument. Any one using a safety razor is familiar with the disconcerting fact that a new blade inserted in the razor to replace a worn blade often gives results less satisfactory than the discarded worn blade, owing to the comparatively less efficient cutting edge of the new blade. There is a vast difference in the efficiency of the cutting edges of individual units of a set of blades put on the market by the same manufacturer, although the blades have passed as close and as careful an inspection as the present practice affords. The reason is not far to seek. No human organ is sensitive enough to detect the variations in the sharpness of a well finished, presumably perfect, cutting edge of a razor blade, without some auxiliary, amplifying means. On the other hand, any manual or mechanical device involving physical contact with the blade, if applied to the desired purpose, assuming, improbable though this seems to be, that the desired purpose can be accomplished in such a manner, would be sure to fatally injure the cutting edge and thus defeat its object.

To overcome these difficulties, I have conceived the idea of substituting for the cutting edge a definite manifestation of this edge under certain conditions, the method of inspection being correlated to this manifestation in a manner which I will now briefly explain.

Every irregularity in the cutting edge may be said to be either a minute protuberance, having a more or less sharp point, or a minute, more or less sharp depression. The apex of the protuberance, or the bottom of the depression, no matter how sharp, has a certain microscopically small curvature. The manifestations selected for the purpose of detecting faults in the cutting edge are functions of these small curvatures. The sharper is the point of any protuberance on the cutting edge, i. e., the smaller is the minute radius of curvature at such a point, the more pronounced is the manifestation. These manifestations are brought about by creating a sufficiently great difference in potential between the sharp edged metallic body and the surrounding medium to cause a flux along the sharp edge. This difference in potential may be created in various ways, and the nature of the flux will correspondingly vary, although the method of detection remains substantially the same in principle. Thus, the difference in potential may be created by imparting to the metallic body an electrical charge of such intensity as to cause a discharge of electricity along the sharp edge. This discharge may be dark or luminous. In the latter case, however, only corona or brush discharges are contemplated, sparks and arcs being avoided because of their injurious effect upon the cutting edges of tools. Elimination of sparking is effected by a proper combination of all determining influences, such as the magnitude of the E. M. F., length of gap, choice of dielectric, and other various factors which control the nature and form of the discharge. The difference in potential may also be created by conveying to the body a magnetic charge of such intensity as to induce a magnetic flux along the sharp edge. In another form, it may be created by heating the body and confining heat radiation to the sharp edge. In every case, a flux, due to the difference in potential between the body and the surrounding medium, is caused to take place along the sharp edge of the body and, whenever necessary, it is confined to this edge. The flux may be electric, magnetic, electro-magnetic, thermal, dark, or luminous, but the method of detection remains the same in principle, which may be stated briefly as follows:

The density of the flux at any point of the sharp edge is a function of the minute curvature at that point. Flux density, therefore, is a measure of this curvature. Accordingly, the method of detection comprises means for observing, measuring, indicating, or recording the flux density at any point of the sharp edge of the body.

Ordinarily, no absolute measure of the irregularity in the sharp edge of the body is necessary or desired. When the intended purpose of inspection is to merely detect the general condition of the edge, only variations in this condition from point to point of the edge, and therefore, only variations in the relative density of the flux need to be observed or indicated. However, the present method affords also a direct measure of the sharpness of the edge for which, in practice, a standard may be adopted from indications obtained by the application of this method to each particular class of bodies, one standard being adopted for razors and razor blades, another for saws, still another for milling cutters, or for blanking dies, and so on. Having adopted a standard, whether as to sharpness of the edge, or as to its general condition, a defective blade or tool may be automatically, or otherwise, removed from any set of such articles undergoing inspection.

A clearer understanding of the working of the present invention will be had from the detailed description which follows.

In the drawings, Figure 1 is a partly diagrammatic view, in vertical cross section, of the preferred form of my invention, wherein use is made of a luminous brush discharge, and the sharp edged body is a safety razor blade. Figure 2 is a horizontal cross section of the device shown in Figure 1, taken along the line 2—2, omitting the electrical circuits. Figure 3 is a diagrammatic plan view of a modification of my invention, applicable when used in conection with a dark discharge. Figure 4 is a cross section of the same device taken along the line 4—4 of Figure 3. Figure 5 is a further modification of a system embodying my invention, also in plan view, illustrating another method of utilizing a dark discharge. Figure 6 is a cross section of the device shown in Figure 5, taken along the line 6—6, disclosing the electrical circuits omitted from Figure 5. Figures 7 and 8 are, respectively, a top and a side view of still another modification of my invention, based on the use of magnetic flux. Figures 9 and 10 are diagrammatic views of two further modifications of the present invention, the first one making use of a magnetic flux, and the second one, of heat radiation. Figure 11 is a partial view of a system identical with the one shown in Figures 1 and 2, but applied to the detection of irregularities in the cutting edges of a milling tool. Figure 12 is a cross section of the milling cutter shown in Figure 11. Figure 13 is a view, partly in cross section, of a blanking die. Figures 14 and 15 are, respectively, partial vertical and horizontal views of a device similar to the one illustrated in Figures 1 and 2 and differing from it only in that the electrical discharge from the cutting edge takes place directly into the surrounding air, instead of proceeding from the cutting edge to an electrode of opposite polarity. Figure 16 is a detail showing a variant of the detector used in the system. Figure 17 is another detail showing how the detector may be replaced by a method of direct observation.

Referring to the figures in detail, in Figures 1 and 2, a casing 1 is shown, preferably of a metal adapted to act as a shield for the enclosed apparatus, to eliminate disturbances of an electric or electro-magnetic nature, the casing 1 being grounded at 2. In the casing 1, a support 3, of insulating material, carries a set of rollers 4 on which travels a conveyor 5. The conveyor 5 enters the casing 1 through the opening 6 in the casing and emerges through the opening 7. The conveyor bears a series of safety razor blades 8 of a well known type, the placing and spacing of the blades being effected by means of pins 9 on the conveyor 5, which pins fit into the holes made for similar purposes in razor blades of this particular type. Between each pair of blades 8 are separators 10 of a highly insulating material, the function of which is to prevent any discharge along the non-cutting edges of the blades. The separators 10 extend beyond the ends of the cutting edges of the blades, where they are curved upwards, as shown, at 11, so as to eliminate the excessive flux at the points where the cutting edges meet the non-cutting edges of the blade. Through an insulating block 15 in the top of the casing 1, passes a brush 12 connected with one of the terminals of an electric current supply, which may be direct, or alternating, as is indicated by the dotted lines L, L, separating the two circuits. The A. C. supply is shown as a standard induction coil circuit and is denoted by ACS (alternating current supply). The circuit being standard, it is not deemed necessary to describe it in detail. For the same reason, the direct current supply is merely indicated by the letters DCS (direct current supply). The brush 12 makes contact with the blade 8, as shown. On the support 3, vertically disposed plates 13, of any dielectric material suitable to the requirements of the particular set of conditions imposed on the flux, face the cutting edges of the blades 8. Back of each plate 13 and in contact therewith, is a plate electrode 14 connected to the other terminal of the current supply, by a wire passing through an insulating block 15' in the top of the casing 1. When the blades 8 are electrically charged, either from DCS, or from ACS, and the conditions are such as to produce a luminous brush discharge from the cutting edge of a blade to the electrode 14, the light from the brush discharge is directed to a photo-electric cell 16, preferably enclosed in a box 17, through suitable openings in the support 3, casing 1, and box 17, these openings being designated respectively by the numerals 18, 19 and 20. In Figure 1, two alternative methods for directing a beam of light from the brush discharge to the photo-electric cell are shown. On the left hand side of the figure, the beam is made to pass through a lens 21 inserted in the opening 20 of the box 17. On the right hand side of the figure, the beam of light is directed through a rod 22 of fused quartz, bent, as shown, one extremity, 22', of the rod being pointed, and the other, 22'', being formed into a straight edge at a right angle to the edge of the blade. Whether a lens or a rod of fused quartz is used for directing the beam of light, it is preferable to add a mirror, such as 21', shown in the drawings on the left hand side only, attached to the top of the casing 1. The mirror 21' reflects such beams as are directed away from the cell 16 back to the brush discharge, thus reducing the unavoidable dissipation of light energy. On the bottom of the casing 1, movable shutters 23 are provided to regulate the opening for the passage of the beam of light. The photo-electric cells are elements of standard amplifying circuits, which are shown, but not described, these circuits being well known and understood in the art. Nor is the nature of the output receiving apparatus a part of the present invention. For this reason, the various means for indicating or for recording the variations in the output are not shown, except that on the left hand side, as a specific illustration, a galvanometer 25 is shown. On the right hand side, the terminals 24, 24, may be connected with any suitable indicating, measuring, or recording instrument, not shown. Instead of showing such an instrument, and as another specific illustration of the application of my detecting method, I have shown a double relay which closes a circuit $(+, -)$ whenever the output in the photo-electric circuit falls below a predetermined minimum, or rises above a predetermined maximum. The bar of soft iron 46 is magnetized by the current of the photo-electric circuit. The contact 47, on an elastic arm 47', is attracted to the bar 46, against the action of the spring 47'', when the current in the photo-electric cell circuit rises above a fixed, predetermined amount. The contact 48, on the elastic arm 48', is pulled away from the bar 46 by the spring 48'' whenever the current in the photo-electric cell circuit falls below a fixed predetermined minimum. This relay may be used either to operate a mechanism for automatically throwing out any blade that does not come up to standard specifications, or to energize a signal, such as a bell, for instance, every time a blade falls below standard specifications, the blade being thereupon manually removed by an operator or inspector. The present invention is not concerned with devices for removing faulty blades, and, accordingly, only the relay necessary for such an operation is shown.

It will be noted that the areas of the electrodes 14 are not the same on both sides of Figures 1 and 2. These areas may be varied within a wide range without affecting the principle of operation. The electrodes need not have plane surfaces but may be variously shaped. The dielectric bodies need not be solid, although so shown in the drawings. The arrangement in the drawings in no sense exhausts all the possible arrangements and is not intended to be more than an illustration. Nor is the present invention limited to an arrangement involving the electrodes 14 and dielectric bodies 13. The dielectric, or both, the electrode and the dielectric, may be omitted, and the discharge may take place directly into the surrounding air. The arrangement shown in Figures 1 and 2, however, is preferred because it creates a bias, localizes the discharge, and affords better means for regulating it, owing to the additional factors of gap length and choice of dielectric, which may be so selected and coordinated with the E. M. F. applied to the blades 8 as to satisfy a wider range of predetermined conditions.

When the discharge takes place directly into the surrounding air, it may be biased or localized by providing a dielectric screen 49, Figures 14 and 15, in front of the cutting edge of the blade 8, having an aperture 50 through which the discharge is allowed to pass freely, while the impenetrable screen 19 (assuming, of course, that the E. M. F. applied to the blade 8 does not exceed the limit imposed by the conditions of the problem) prevents the discharge from taking place at other points of the cutting edge.

As the conveyor brings one blade after another into contact with the brush 12, the blades are successively charged with electricity which is discharged along the cutting edges in the form of visible brushes directed from the cutting edge to the electrode 14. The intensity of the discharge, being a function of the minute radius of curvature at each point of the cutting edge, varies from point to point of this edge, and the variations in light intensity are registered by the photo-electric cell 16 which receives the beam of light from the brush discharge in the manner shown and explained. The variations in the output of the photo-electric cell circuit are noted on any suitable instrument, such as

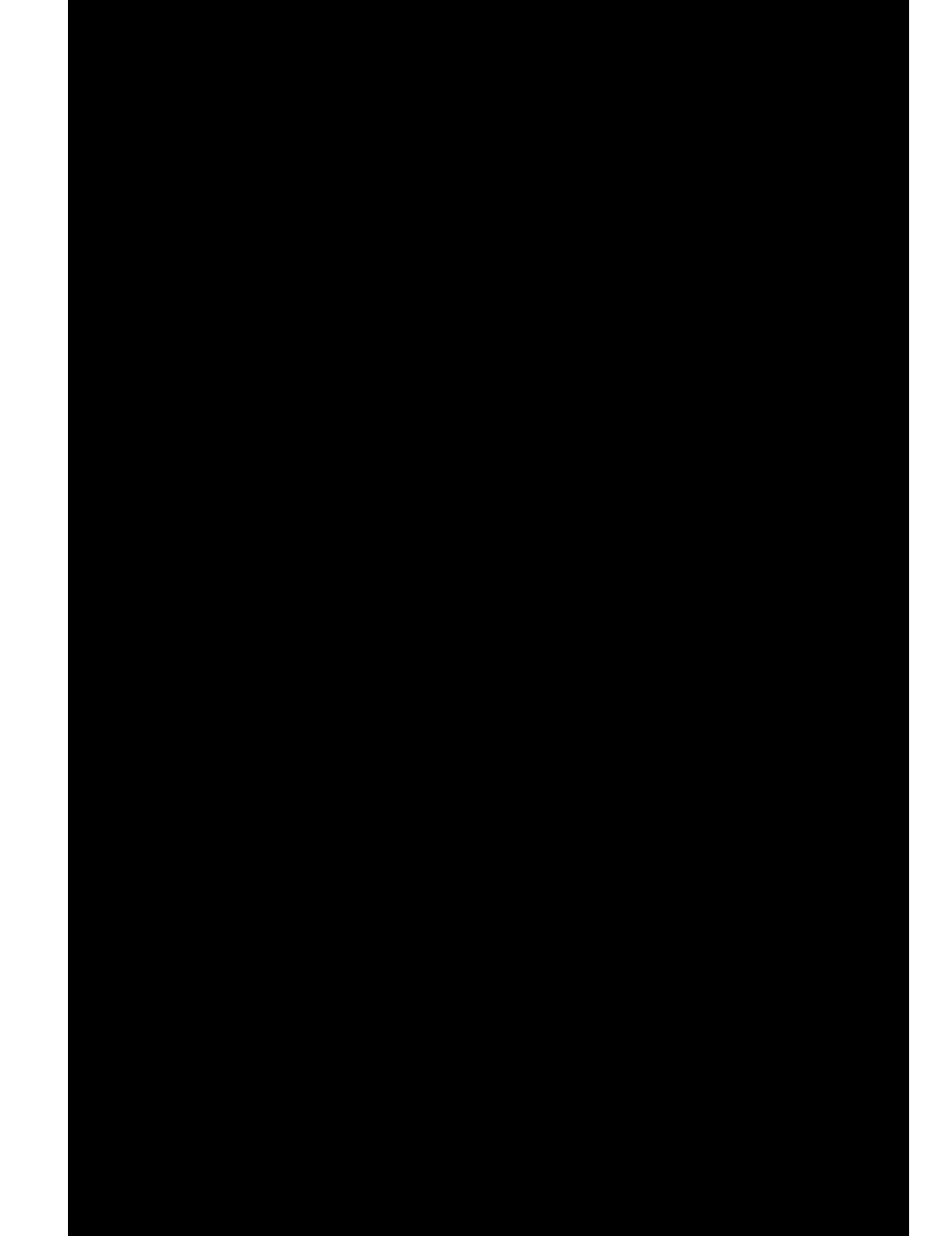

coil 35 and is covered by an insulation 8' extending over its entire surface except the cutting edge, 8". Facing the cutting edge 8", close to it, is a mirror 32, hinged at 33. A point 38 of the mirror 32, close to the hinge 33 is connected to a fixed point 37 by a short strip of metal of high heat conductivity, 36. This strip 36 may, also, be bimetallic, the two metals having different coefficients of heat expansion. Radiation from the edge of the blade, as in previously illustrated examples, is a function of the minute radius of curvature at any point of the edge 8". The radiated heat expands the strip 36, or distorts it, if it is bimetallic, more or less, according to the density of the flux, thereby changing the inclination of the mirror 32, so that a beam of light, 32', striking the mirror, will be reflected, as the beam 32", at different point of the scale 34. The variation in the condition of the cutting edge 8" of the razor blade is thus indicated on the scale 34.

While, in the preceding illustrations, only razor blades are shown, clearly, the present system of detection is applicable to any metallic body having a sharp edge. In order to show that the method is equally practicable in other cases, its application to a milling cutter is illustrated in Figures 11 and 12. The method used here is the same as the one illustrated in Figures 1 and 2. The milling cutter 39 is given an electrical charge through the brush 12, from any convenient source (not shown). Preferably, the cutter is covered by an insulation 40 which leaves only the cutting edges 41 exposed. The charge is such as to produce a visible brush discharge along the cutting edge. The light of this discharge, directed through the lens 21, is received on the photo-electric cell 16 forming an element of a standard photo-electric circuit, such as is shown in Figure 1. As in the former illustration, an electrode 14 of opposite polarity to that of the body 39 is provided, and a dielectric 13 is interposed in the gap. The procedure is the same as in the former case, except that rotation of the cutter on the axle 45 and axial translation replace the movement of the conveyor 5.

The system is not limited to cutting tools. Any metallic body having a sharp edged portion may be subjected to my method of detection. Thus, in Figure 13, a blanking die is shown. The edges of both, the male and the female members, 42 and 43, become worn after much use. To detect the condition of these edges, the body (male, or female) is charged in the manner described, and the variations in the density of the flux along the sharp edge are measured or indicated, as before. In the case of a visible discharge, it is preferable to interpose the dielectric 44 in the gap. The two parts of the die may be used as electrodes of opposite polarity.

The amplifying circuit shown in Figure 1 is not always necessary. Direct indications may be obtained on the flux responsive detector element. In Figure 16 is shown a self-recording detector device without any amplifying means. The beam of light from the discharge, passing through the lens 21, is received on a light sensitive strip 51, as in a camera, the strip 51 passing from one roller 52 to another, 53, and this strip records variations in the intensity of the light. When the irregularities of the sharp edges of the body under inspection are very pronounced, even the detector device may be eliminated. For instance, in the case of a visible discharge, the variations in the condition of the cutting edge may be noted directly from the discharge, from point to point of the edge, or, by projecting a beam of light from the discharge onto a ground glass plate, 54, Figure 17, and observing the variations in the intensity of the projected light through an opening 55 in the box 17.

From the preceding description, it must be clear that many other modifications of the present invention may be made by those skilled in the art, without departing from the principle and the method of its application, as illustrated herein, and it is to be understood that, in presenting various examples of my system, I do not intend to limit the invention to the specific illustrations shown.

I claim:

1. A system for detecting the condition of the edge of a sharp edged metallic body comprising means for creating a sufficiently great difference in potential between said body and the surrounding medium to cause a flux along said edge, a detector responsive to said flux, and means associated with said detector for measuring the density of said flux.

2. A system for detecting the condition of the edge of a sharp edged metallic body comprising means for creating a sufficiently great difference in potential between said body and the surrounding medium to cause a flux along said edge, a detector responsive to said flux, and means for causing relative movement between said detector and said body.

3. A system for detecting the condition of the edge of a sharp edged metallic body comprising means for creating a sufficiently great difference in potential between said body and the surrounding medium to cause a flux along said edge, a detector responsive to said flux, means for causing relative movement between said detector and said body, and means associated with said detector for indicating variations in the density of said flux responsive to said relative movement.

4. A system for detecting the condition of the edge of a sharp edged metallic body comprising means for creating a sufficiently great difference in potential between said body and the surrounding medium to cause a flux along said edge, means for biasing said flux, a detector responsive to the biased flux, and means associated with said detector for measuring the density of said biased flux.

5. A system for detecting the condition of the edge of a sharp edged metallic body comprising means for creating a sufficiently great difference in potential between said body and the surrounding medium to cause a flux along said edge, means for biasing said flux, a detector responsive to the biased flux, means for causing relative movement between said detector and said body, and means associated with said detector for indicating variations in the density of said biased flux responsive to said relative movement.

6. A system for detecting the condition of the edge of a sharp edged metallic body comprising means for creating a sufficiently great difference in potential between said body and the surrounding medium to cause a flux along said edge, a flux biasing body in proximity to said edge, and means for causing relative movement between said flux biasing body and said sharp edged body.

7. A system for detecting the condition of the edge of a sharp edged body comprising means for creating a sufficiently great difference in potential between said body and the surrounding medium to cause a flux along said edge, and a detector responsive to said flux.

8. A system for detecting the condition of the edge of a sharp edged body comprising means for creating a sufficiently great difference in potential between said body and the surrounding medium to cause a flux along said edge, a flux biasing body in proximity to said edge, and a detector responsive to the biased flux.

9. A system for detecting the condition of the edge of a sharp edged electrically conductive body comprising means for conveying to said body a sufficiently great electrical charge to cause an electrical discharge along said edge, a detector responsive to said discharge, and means associated with said detector for measuring the density of said discharge.

10. A system for detecting the condition of the edge of a sharp edged electrically conductive body comprising means for conveying to said body a sufficiently great electrical charge to cause an electrical discharge along said edge, a detector responsive to said discharge, and means for causing relative movement between said detector and said body.

11. A system for detecting the condition of the edge of a sharp edged electrically conductive body comprising means for conveying to said body a sufficiently great electrical charge to cause an electrical discharge along said edge, a detector responsive to said discharge, means for causing relative movement between said detector and said body, and means associated with said detector for indicating variations in the density of said discharge responsive to said relative movement.

12. A system for detecting the condition of the edge of a sharp edged electrically conductive body comprising means for conveying to said body a sufficiently great electrical charge to cause an electrical discharge along said edge, means for biasing said discharge, a detector responsive to the biased discharge, and means associated with said detector for measuring the density of said biased discharge.

13. A system for detecting the condition of the edge of a sharp edged electrically conductive body comprising means for conveying to said body a sufficiently great electrical charge to cause an electrical discharge along said edge, a body in proximity to said edge for biasing said discharge, and means for causing relative movement between said discharge biasing body and said sharp edged body.

14. A system for detecting the condition of the edge of a sharp edged electrically conductive body comprising means for conveying to said body a sufficiently great electrical charge to cause an electrical discharge along said edge, means for biasing said discharge, a detector responsive to the biased discharge, means for causing relative movement between said detector and said body, and means associated with said detector for indicating variations in the density of said biased discharge responsive to said relative movement.

15. A system for detecting the condition of the edge of a sharp edged electrically conductive body comprising means for conveying an electrical charge to said body sufficiently great to cause an electrical discharge along said edge, and a detector responsive to said electrical discharge.

16. A system for detecting the condition of the edge of a sharp edged electrically conductive body comprising means for conveying an electrical charge to said body sufficiently great to cause an electrical discharge along said edge, a body in proximity to said edge for biasing said discharge, and a detector responsive to the biased discharge.

17. The method of detecting the condition of the edge of a sharp edged body which consists in creating a sufficiently great difference in potential between said body and the surrounding medium to cause a flux along said edge, and noting the difference in the intensity of said flux from point to point of said edge.

18. The method of detecting the condition of the edge of a sharp edged body which consists in creating a sufficiently great difference in potential between said body and the surrounding medium to cause a flux along said edge, biasing said flux, and noting the difference in the intensity of the biased flux from point to point of said edge.

19. The method of detecting the condition of the edge of a sharp edged electrically conductive body which consists in conveying to said body an electrical charge sufficiently great to cause an electrical discharge along said edge, biasing said discharge, and noting the difference in the intensity of the biased discharge from point to point of said edge.

20. A system for detecting the condition of the edge of a sharp edged electrically conductive body comprising means for conveying to said body an electrical charge sufficiently great to cause a visible electrical discharge along said edge, but not so great as to cause sparking, a light responsive detector in the luminar field of said dicharge, and means associated with said detector for measuring the intensity of said light.

21. A system for detecting the condition of the edge of a sharp edged electrically conductive body comprising means for conveying to said body an electrical charge sufficiently great to cause a visible electrical discharge along said edge, but not so great as to cause sparking, a light responsive detector in the luminar field of said discharge, and means for causing relative movement between said light responsive detector and said body.

22. A system for detecting the condition of the edge of a sharp edged electrically conductive body comprising means for conveying to said body an electrical charge sufficiently great to cause a visible electrical discharge along said edge, but not so great as to cause sparking, a light responsive detector in the luminar field of said discharge, means for causing relative movement between said detector and said body, and means associated with said detector for indicating variations in the intensity of said light responsive to said relative movement.

23. A system for detecting the condition of the edge of a sharp edged electrically conductive body comprising means for conveying an electrical charge to said body, an electrode of polarity opposite to the polarity of said body in proximity to said edge, said electrical charge being sufficiently great to cause a visible electrical discharge from said edge to said electrode, but not so great as to cause sparking, a detector having a light responsive element in the luminar field of said discharge, and means associated with said detector for measuring the intensity of said light.

24. A system for detecting the condition of the edge of a sharp edged electrically conductive body comprising means for conveying an electrical charge to said body, an electrode of polarity opposite to the polarity of said body in proximity to said edge, said electrical charge being sufficiently great to cause a visible electrical discharge from said edge to said electrode, but not so great as to cause sparking, a detector having an element responsive to the luminar field of said discharge, means for causing relative movement between said electrode and said body, and means associated with said detector for indicating variations in the intensity of the light of said discharge responsive to said relative movement.

25. A system for detecting the condition of the edge of a sharp edged electrically conductive body comprising means for conveying an electrical charge to said body, an electrode of polarity opposite to the polarity of said body in proximity to said edge, said electrical charge being sufficiently great to cause a visible electrical discharge from said edge to said electrode, but not so great as to cause sparking, a detector circuit having as one of its elements a photo-electric cell, means for directing a beam of light from said discharge to said cell, and means for measuring the output of said detector circuit.

26. A system for detecting the condition of the edge of a sharp edged electrically conductive body comprising means for conveying an electrical charge to said body, an electrode of polarity opposite to the polarity of said body in proximity to said edge, said electrical charge being sufficiently great to cause a visible electrical discharge from said edge to said electrode, but not so great as to cause sparking, a detector circuit having as one of its elements a photo-electric cell, means for directing a beam of light from said discharge to said cell, means for causing relative movement between said body and said electrode, and means for indicating variations in the output of said detector circuit responsive to said relative movement.

27. A system for detecting the condition of the edge of a sharp edged electrically conductive body comprising means for conveying an electrical charge to said body, an electrode of polarity opposite to the polarity of said body in the proximity of said edge, a dielectric interposed between said edge and said electrode, said electrical charge being sufficiently great to cause a visible discharge from said edge to said electrode, but not so great as to cause sparking, a detector circuit having as one of its elements a photo-electric cell, means for directing a beam of light from said discharge to said cell, means for reflecting other beams of light from said discharge back thereto, and means for measuring the output of said detector circuit.

28. A system for detecting the condition of the cutting edges of safety razor blades comprising a conveyor carrying said blades, means for applying an electrical charge to said blades in succession as they are advanced by said conveyor, a stationary electrode of polarity opposite to the polarity of said blades in proximity to said conveyor, a solid dielectric interposed between the cutting edges of said blades and said electrode, said electrical charge being sufficiently great to cause a visible brush discharge from said edges to said electrode, but not so great as to cause sparking, a detector circuit having as one of its elements a photo-electric cell, means for directing a beam of light from said brush discharge to said cell, means for reflecting other beams of light from said discharge back thereto, and means for indicating variations in the output of said detector circuit responsive to the movement of said conveyor.

29. A system for detecting the condition of the edge of a sharp edged electrically conductive body comprising means for conveying an electrical charge to said body, an electrode of polarity opposite to the polarity of said body in proximity to said edge, said electrical charge being sufficiently great to cause a visible electrical discharge from said edge to said electrode, but not so great as to cause sparking, and means for causing relative movement between said electrode and said body.

30. A system for detecting the condition of the edge of a sharp edged electrically conductive body comprising means for conveying an electrical charge to said body sufficiently great to cause a visible electrical discharge along said edge, but not so great as to cause sparking, and a light responsive detector in the luminar field of said discharge.

31. A system for detecting the condition of the edge of a sharp edged electrically conductive body comprising means for conveying an electrical charge to said body, an electrode of polarity opposite to the polarity of said body in proximity to said edge, said electrical charge being sufficiently great to cause a visible electrical discharge from said edge to said electrode, but not so great as to cause sparking, and a light responsive detector in the luminar field of said discharge.

32. The method of detecting the condition of the edge of a sharp edged electrically conductive body which consists in conveying to said body an electrical charge sufficiently great to cause a visible electrical discharge along said edge, but not so great as to cause sparking, and noting the difference in the light intensity of said discharge from point to point of said edge.

In testimony whereof I have affixed my signature.

PETER NICHOLAS PETERS.